(12) United States Patent　　(10) Patent No.: US 6,390,135 B1
Shimizu　　(45) Date of Patent: May 21, 2002

(54) CONDUIT ASSEMBLY AND METHOD OF INSTALLATION

(75) Inventor: Shohachi Shimizu, Ogaki (JP)

(73) Assignee: Mirai Industry Co., Ltd. (JP)

( * ) Notice: Subject to any disclaimer, the term of this patent is extended or adjusted under 35 U.S.C. 154(b) by 0 days.

(21) Appl. No.: 09/306,354

(22) Filed: May 6, 1999

(30) Foreign Application Priority Data

May 15, 1998　(JP) .......................................... 10-133719
Mar. 5, 1999　(JP) .......................................... 11-058835

(51) Int. Cl.$^7$ .............................................. F16L 55/10
(52) U.S. Cl. ...................... 138/89; 138/106; 138/108; 138/110; 138/112; 138/116; 138/117
(58) Field of Search ................. 138/110, 89, 106, 138/108, 112, 115, 116, 117

(56) References Cited

U.S. PATENT DOCUMENTS

| | | | | |
|---|---|---|---|---|
| 376,893 A | * | 1/1888 | Lindemann .................. | 138/115 |
| 3,592,956 A | * | 7/1971 | Fork ............................ | 138/115 |
| 3,731,448 A | * | 5/1973 | Leo .............................. | 138/112 |
| 3,793,793 A | * | 2/1974 | Dobbins ...................... | 138/117 |
| 3,895,830 A | * | 7/1975 | Madlem ....................... | 138/117 |
| 4,093,818 A | * | 6/1978 | Thwaltes et al. ........... | 138/108 |
| 4,147,449 A | * | 4/1979 | Kato ............................ | 138/117 |
| 4,304,079 A | | 12/1981 | Thorsten | |
| 4,347,998 A | * | 9/1982 | Loree .......................... | 138/115 |
| 4,355,664 A | * | 10/1982 | Cook et al. .................. | 138/103 |
| 4,419,535 A | | 12/1983 | O'Hara | |
| 5,415,155 A | * | 5/1995 | Cohen et al. ................ | 138/115 |
| 5,560,397 A | * | 10/1996 | Miller et al. ................. | 138/110 |
| 5,738,147 A | * | 4/1998 | Mestres ....................... | 138/117 |

FOREIGN PATENT DOCUMENTS

| | | |
|---|---|---|
| DE | 39 23 197 | 2/1990 |
| DE | 39 02 238 | 8/1990 |
| DE | 93 01 863 | 5/1993 |
| EP | 0 278 544 | 8/1988 |
| FR | 2 634 954 | 2/1990 |

\* cited by examiner

*Primary Examiner*—James Hook
(74) *Attorney, Agent, or Firm*—Akerman Senterfitt

(57) ABSTRACT

A conduit assembly for a partition for receiving wires, hoses, or cables. The conduit assembly includes passages and foaming material, which expands on the outer surface of the conduit assembly. The conduit assembly is arranged in a through hole, which is formed in the partition. The foaming material expands when heated, thus fixing the conduit assembly in the partition. The conduit assembly further includes spare passages. Detachable plugs close the spare passages. When adding more wires, hoses, or cables to the conduit assembly, the plugs are removed.

28 Claims, 8 Drawing Sheets

CONDUIT ASSEMBLY AND METHOD OF INSTALLATION

BACKGROUND OF THE INVENTION

The present invention relates to a conduit assembly used to permit elongated objects such as wires, cables, hoses and pipes to pass through partitions such as walls and floors.

FIGS. 13 and 14 show a process of forming a passage structure for allowing cables 62 to pass through a partition 63. The passage structure has a dual structure. In FIG. 13, installation of the lower side of the passage structure has been substantially completed, and the upper side of the passage structure is in the early stage of installation. In FIG. 14, installation of both the upper and the lower sides of the passage structure is completely finished. In this passage structure, the cables 62 are supported by a ladder-like rack 61. Each rack 61 is made of a pair of rails and a plurality of rods (only one shown) connecting the rails.

Installation of the passage structure in the partition 63 will now be described. First, the cables 62 are inserted in a through hole 64. Then, the cables 62 are placed on the rack 61. With the position of the rack 61 adjusted with respect to the through hole 64, a fireproof material 65 such as rock wool is filled in the space between the outer surface of the cables 62 and the racks 61 and the inner surface of the through hole 64. Through holes 67 corresponding to the racks 61 and the cables 62 are formed in fireproof boards 66. The racks 61 and the cables 62 are inserted in the through holes 67, and the fireproof board 66 is fixed to the outer surface of the partition 63 (as shown by the lower side of the passage structure of FIG. 13). Finally, fireproof sealant is charged into the space between the inner surface of the through holes and the outer surfaces of the racks 61 and the cables 62 (the state shown in FIG. 14) to form a fireproof seal 68. In this way, the cables 62 are supported on the racks 61 and pass through the partition 63.

However, in the conventional method of installation, the racks 61 and the cables 62 have to be held by a worker while the fireproof sealant 68 is being charged to fix their positions with respect to the through hole 64. This makes installation troublesome. Also, the space between the inner surface of the through hole 64 and the outer surface of the racks 61 and the cables 62 is relatively large. Therefore, since the amount of fireproof material 65 that can be filled at one time is limited even if a caulking machine is used, filling takes a long time. Further, the fireproof material 65 may move downward from its weight, and this makes it difficult to fill the fireproof material 65 without leaving space.

Furthermore, through holes 67 must be formed on a fireproof plate 66 to correspond to the shapes of the rack 61 and the cables 62. The through holes 67 are formed at the site of construction prior to installation of the passage structure. This is troublesome work, which lowers the efficiency of the installation.

On the other hand, when the number of the cables 62 has to be increased later, the installed passage structure must be dissembled. Then, cables are added and the passage structure is reconstructed. Therefore, increasing the number of cables 62 after installation is extremely inefficient and results in high costs.

SUMMARY OF THE INVENTION

The first objective of the present invention is to provide a conduit device and its method for forming a passage structure that fixes elongated objects such as wires, hoses, cables, and pipes in a partition.

The second objective of the present invention is to provide a conduit device that permits additional elongated objects to be passed through the conduit after an initial installation of the conduit device.

To achieve the above objectives, the present invention provides a conduit assembly for permitting an elongated object to pass through a through hole formed in a partition. The through hole has a first opening and a second opening opposite to the first opening. The conduit assembly has a conduit and a fixing material. The conduit is located within the through hole. The conduit has a first end located adjacent to the first opening, a second end located adjacent to the second opening and a plurality of ports located at one of the first and the second ends. The elongated object is inserted into at least one of the ports. The fixing material fixes the conduit to the through hole.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2b is a front view of the sleeves of FIG. 2a;

FIG. 10b is a side cross sectional view of the conduit device of FIG. 10a;

DETAILED DESCRIPTION OF THE PREFERRED EMBODIMENTS

A first embodiment of the present invention will now be described with reference to the drawings.

Figure 1:
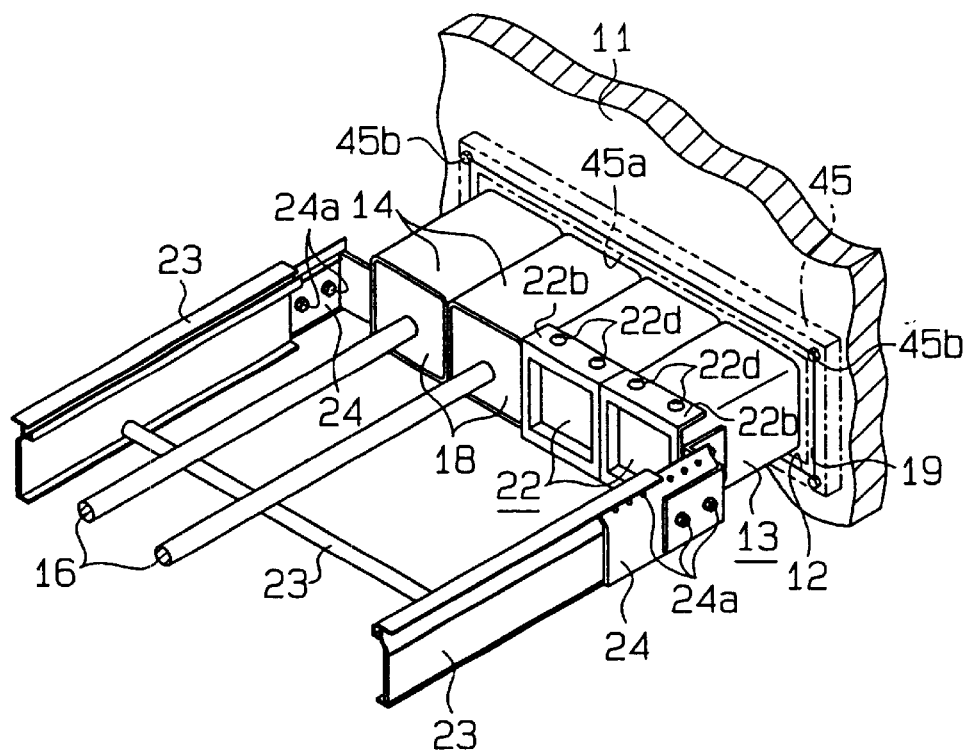
FIG. 1 is a partial perspective view of a conduit device according to a first embodiment of the present invention.
Figure 2A:
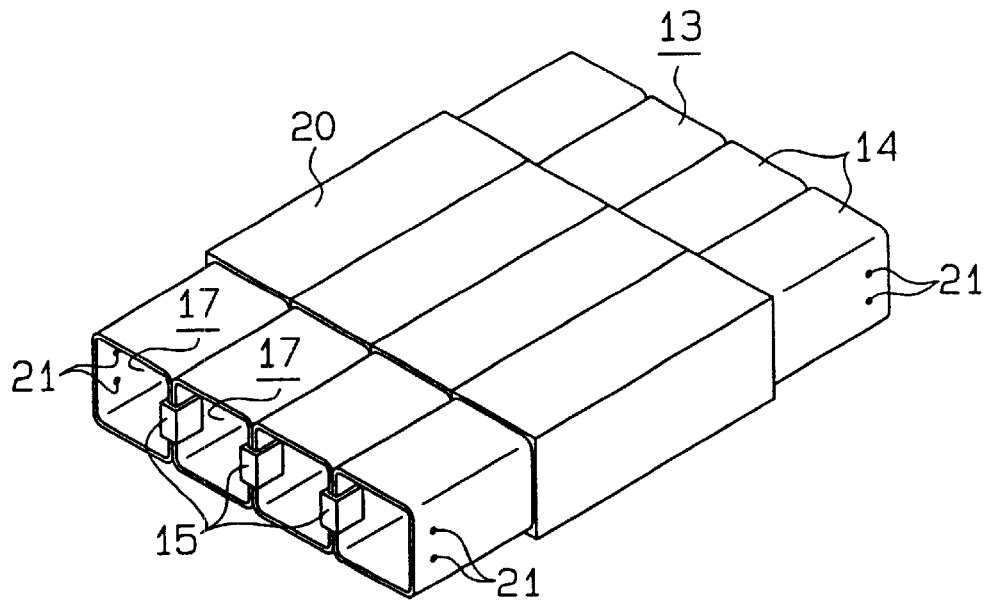
FIG. 2a is a perspective view showing sleeves joined together by a connector.
Figure 2B:
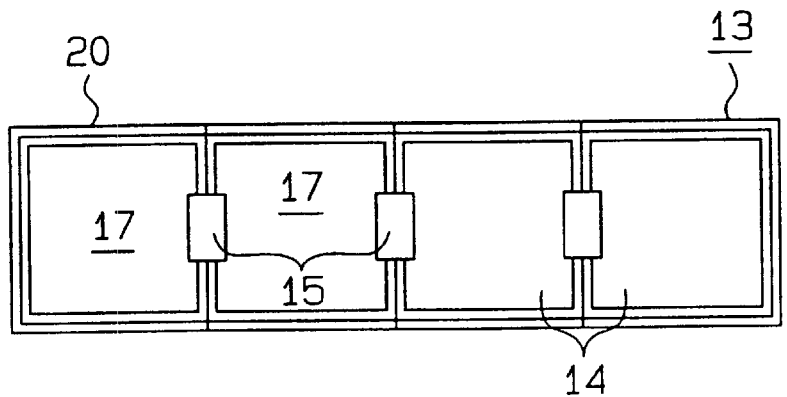

As shown in FIG. 1, a partition 11 may form part of a wall, a floor or a construction beam. A through hole 12 is formed in the partition 11. A conduit device 13 is received in the through hole 12. The conduit device 13 is formed by four sleeves 14. As shown in FIGS. 2a, 2b, the sleeves 14, which are adjacent to each other, are joined by clip-shaped binders 15. Each sleeve 14 forms a passage 17 for receiving elongated objects 16 such as wires, hoses, cables, and pipes. As shown in FIG. 1, the elongated objects 16 are received in two of the four sleeves 14. The openings of the sleeves 14 receiving the elongated objects 16 are sealed by fireproof material such as fireproof sealant 18. On the other hand, the openings of the unoccupied sleeves are covered by plugs 22. Filler 19 seals a space between the outer surface of the conduit device 13 and the inner surface of the through hole 12. The filler 19 is formed by expanding foaming material 20 in a certain way.

Figure 3:
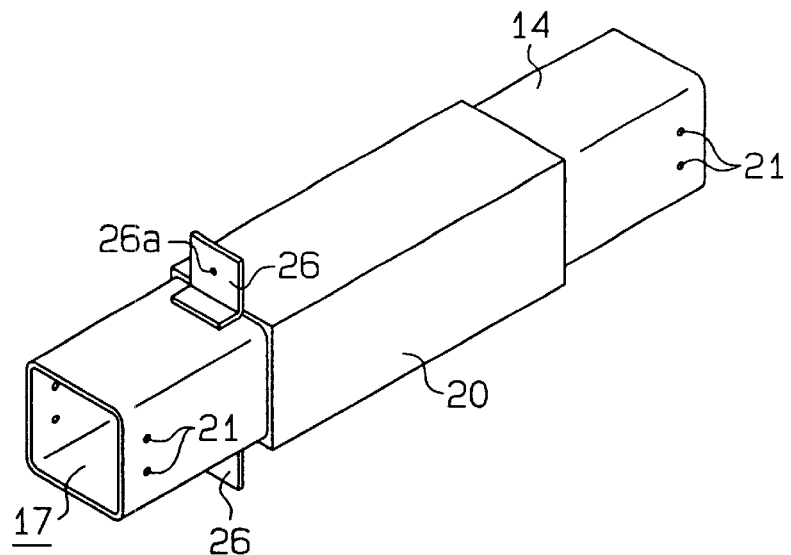
FIG. 3 is a perspective view of one sleeve.
Figure 4:
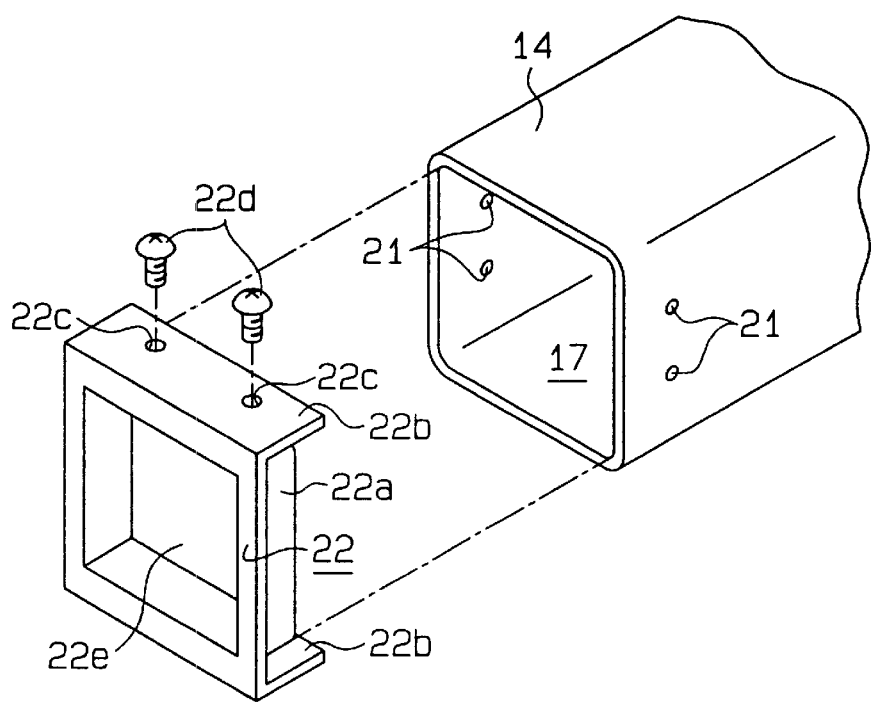
FIG. 4 is an enlarged perspective view of an end of a sleeve and a plug.

As shown in FIG. 2a, the sleeves 14 are arranged in a row. The sleeves 14 are made of metal. As shown in FIG. 3, the cross sectional shape of each sleeve 14 is square. Four connection holes 21, one pair of which faces the other, are formed on the ends of each sleeve 14. The binders 15 are made of metal. Each binder 15 includes a pair of pieces facing one another. A projection (not shown) is formed on the inner surface of each piece of the binder 15 to face the other. Adjacent sleeves 14 are coupled by aligning the connection holes 21 of one sleeve 14 to the connection holes 21 on the other sleeve 14 and then engaging the projections of the binder 15 with the connection holes 21.

As shown in FIGS. 2a and 2b, inorganic foaming material 20 is applied to surround the center area of the outer surface of the conduit device 13. The main component of the foaming material 20 is a synthetic mica that has swelling property and is dispersed or dissolved in alkaline salt solution. The swelling mica is a scale-like fine powder of a sodium-fluorine mica that is synthesized by a solid state reaction. The fine powder has an average particle diameter of 1–5 μm and a thickness of 10 angstroms. The swelling mica forms a complex by intercalating an inorganic or organic compound between its layers. A sodium silicate is used as the alkaline salt. GRANDEX (registered trademark) FJ515, a product of TOKIWA ELECTRIC Inc., is preferably used for the foaming material 20.

A method for manufacturing the foaming material 20 will now be described.

When the scale-shaped powder of the swelling mica is dispersed in a sodium silicate solution, water molecules are adsorbed between the layers of the swelling mica. This swells the swelling mica. Then, the mica is finely cleaved between its layers, and an interlayer cation such as a sodium ion and a lithium ion is dissolved in the solution. Accompanying this, the space between the layers of the mica is negatively charged, and the surface of the layers is positively charged. In this state, a sodium ion, which is derived from sodium silicate, is electrically attracted to the negatively charged space between the layers of the mica. Then, the sodium ion intercalates between the layers and an intercalation compound of mica is formed. This compound is the main component of the liquid foaming material 20. When the liquid foaming material 20 is heated and condensed, it changes into a gel-like material. This gel-like material is applied to the outer surface of the conduit device 13. After the application, the surface of the gel-like foaming material 20 is dried to prevent the material 20 from adhering to other objects.

When the gelled foaming material 20 is heated further, the foaming material 20 foams and expands following the evaporation of water. The foaming material 20 hardens to a sufficient degree after several minutes. When hardened, the volume of the foaming material 20 is three to five times the is. volume of the foaming material 20 in its gel form.

This expansion is based on the following process. The reduction of water from heating is accompanied by the approach of the layers of mica to one another. Since the space between the layers is negatively charged and the surface of the layers is positively charged, the ends of each layer are attracted to the surface of another layer. Then, a three-dimensional molecular structure, which is bulky and shaped like a house of cards, is formed. As the water vaporizes, many spaces are formed in the foaming material 20. In other words, the foaming material 20 expands by the formation of the spaces and by the formation of the house-of-cards structure. As the water evaporates further, the foaming material 20 solidifies. The heating of the foaming material 20 is preferably performed at 150 to 200 degrees Celsius and, if necessary, at higher temperatures.

As shown in FIG. 1, the fireproof sealant 18 fills the space between the inner surface of the passages 17 and the outer surfaces of the elongated objects 16 near the openings, or ports, of the passages 17, with the elongated objects 16 occupying the passages 17. The fireproof sealant 18 may be a material including chloroprene rubber and sodium silicate hydrate (water glass) or a material such as putty.

To plug the spare passages 17, a plug 22 is attached to each unoccupied port of a sleeve 14. The plug 22 includes four rim walls 22a corresponding to the opening rim of the sleeve 14, a pair of attachment pieces 22b, and a plate 22e. The four rim walls are connected to form a rectangular frame. The attachment pieces 22b are parallel to two facing walls of the rectangular frame. A pair of through holes 22c is formed in each attachment piece 22b. When attaching the plug 22 to a port, the rim walls 22a are put into the conduit 13. Screws 22d, which are screwed into the through holes 22c, secure the plug 22 to the conduit 13, thus plugging a port of each spare passage 17.

When increasing the number of elongated objects 16 later, the screws 22d are unscrewed from the through holes 22c and the plug 22 is detached from the conduit 13. This enables passage of a elongated object 16 through each passage 17. After putting the elongated object 16 through the passage 17, the space between the outer surface of the elongated object 16 and the inner surface of the passage 17 is filled with fireproof sealant 18.

Figure 6:
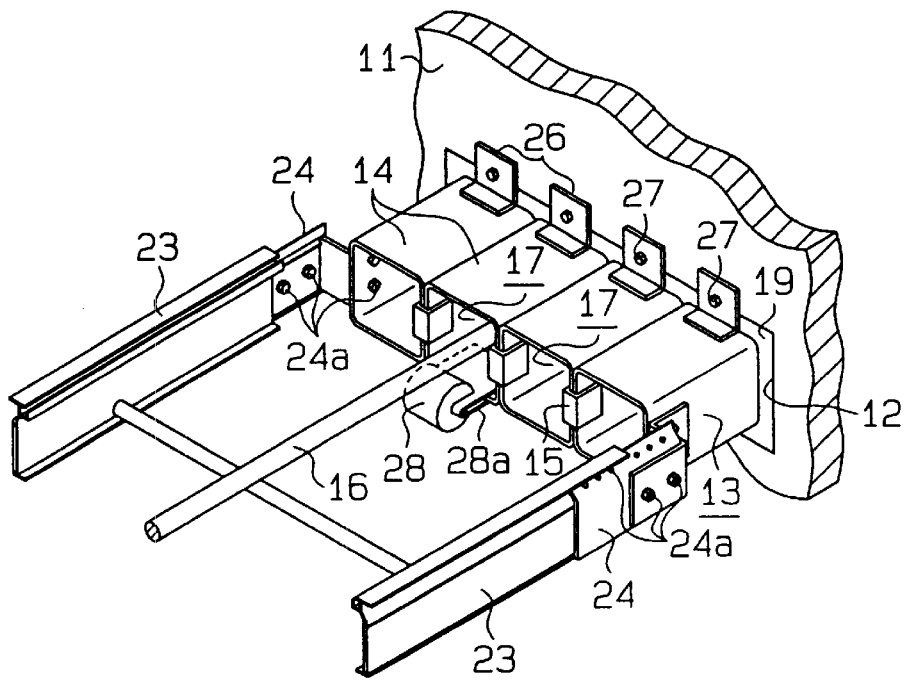
FIG. 6 is a perspective view showing the conduit device fixed in a partition with an adapter attached and a cable received in the conduit device.

As shown in FIGS. 1 and 6, a metal rack 23 includes a pair of rails and rods for connecting the rails. The rack 23 is shaped like a ladder. The rack 23 supports the elongated objects 16, which include cables, electric wires, water pipes, and air conditioner hoses, etc. The rack 23 is fixed to the adapter 24 by screws 24a. The rack 23 is attached to the conduit device 13 by fixing the adapter to the connection holes 21 on the outermost side wall of the conduit 13 with the screws 24a.

The installation of the conduit device 13 in the partition 11 will now be described.

Figure 5:
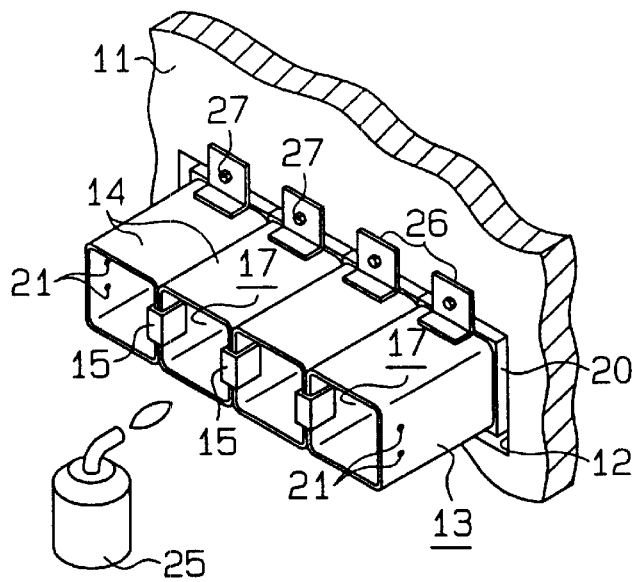
FIG. 5 is a perspective view showing the conduit device being heated for expanding a foaming material.

First, as shown in FIG. 5, the conduit device 13 of FIG. 2a is received in the through hole 12, and the foaming material 20 is located between the inner surface of the through hole 12 and the conduit device 13. Then, the foaming material 20 is heated by heating the conduit device using a burner 25. This evaporates water in the foaming material 20. Accompanying this evaporation, many small spaces are formed in the foaming material 20, and this quickly expands the foaming material 20. The expanded foaming material 20 hardens in several tens of minutes and becomes fireproof filler 19 (see FIG. 6). As a result, the space between the inner surface of the through hole and the conduit device 13 is sealed by t he filler 19. Also, the conduit device 13 is fixed in the partition 11 through the filler 19.

In the above installation, the sleeve 14 shown in FIG. 3, which has an L-shaped fixer 26 welded in advance, may also be used. A hole 26a is formed in the fixer 26. In this case, the conduit device 13 is more rigidly fixed to the partition 11 by screwing a bolt 27 in the partition 11 through each hole 26.

Subsequently, as shown in FIG. 6, racks 23 are attached to the conduit device 13 through adapters 24. Further, to facilitate the insertion of the elongated objects 16 in the passages 17, a roller 28 is attached to the lower rim of one of the sleeves 14 through a clip 28a. When the insertion of the elongated objects 16 is completed, the roller 28 is detached.

The spare passages 17 are closed by the plugs 22. Finally, the fireproof sealant 18 is filled in the space between the inner surface of the passages 17 and the elongated objects 16 in the vicinity of the ends of the passages 17.

The first embodiment has the following advantages.

Since the conduit device 13 is formed by connecting the sleeves 14, the elongated objects 16 are easily inserted.

Since each sleeve 14 of the conduit device 13 includes an independent passage 17, the space between the inner surface of the passage 17 and the elongated object 16 is small when the cable is inserted in the passage 17. This reduces the work of filling the space with fireproof sealant 18.

Since each sleeve 14 is made of metal, heat is efficiently transmitted from the conduit 13 to the foaming material 20. As a result, the foaming material quickly and evenly foams when the inside of the conduit 13 is heated, thus sealing the space between the inner surface of the through hole 12 and the outer surface of the conduit 13.

The foaming material 20 is foamed by heating and hardens quickly. This shortens the time for installing the passage structure to the partition.

Since the filler 19 is formed by just a small amount of the foaming material 20, installation costs are reduced.

The space between the through hole 12 and the conduit device 13 is sealed by the filler 19, and the space between the inner surface of the passage 17 and the outer surface of the elongated object 16 is sealed by the fireproof sealant 18. As a result, the through hole 12 is completely closed. Accordingly, when fire occurs, the through hole 12 and the conduit device 13 do not provide a passage for fire and smoke, thus limiting further advancement of fire and smoke.

Each spare passage 17 is closed by one of the plugs 22. Since the plugs 22 are detachable, the spare passages can be opened as required. Therefore, the number of the elongated objects 16 can be easily and quickly increased.

The sleeves 14 are easily connected by the binders 15. Therefore, the number of the sleeves 14 is easily changed in accordance with the number of the elongated objects 16 received in the through hole 12. Since there is no welding required, the conduit device 13 is easily and quickly assembled.

The conduit 13 includes the connection holes 21 for connecting the rack 23. Therefore, the rack 23 is easily connected to the conduit device 13. Further, since the elongated object 16 is supported by the rack 23, the fireproof sealant 18 between the inner surface of the opening of the passage 17 and the elongated object 16 is prevented from sinking from the weight of the elongated object 16. Accordingly, there is no need add the fireproof sealant 18 again.

Further embodiments will now be described concentrating on the differences from the first embodiment.

Second Embodiment

Figure 7:
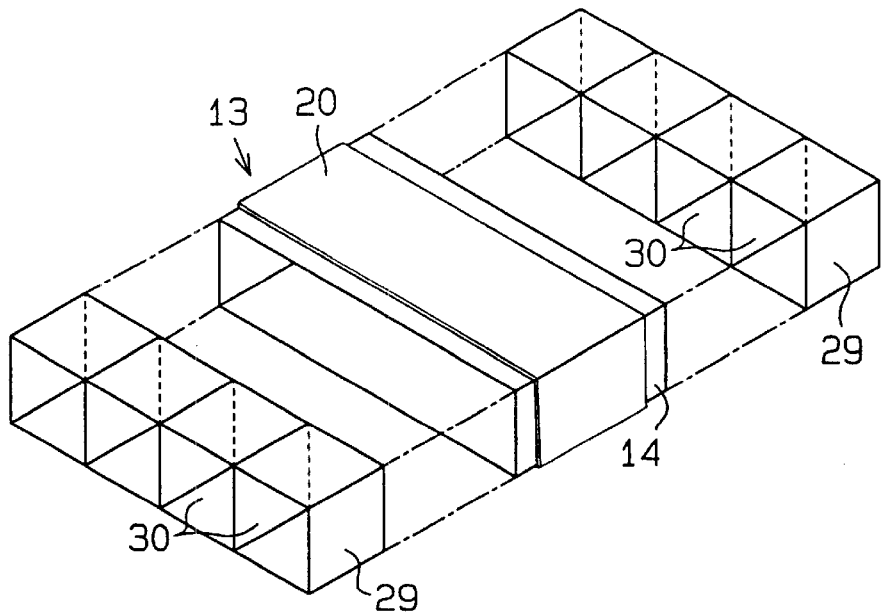
FIG. 7 is an exploded perspective view showing a conduit device of a second embodiment.

As shown in FIG. 7, a conduit device 13 according to a second embodiment includes a sleeve 14, inorganic foaming material 20, and a pair of dividers 29. The sleeve 14 has a wide rectangular cross sectional area. The foaming material 20 is applied to the middle outer surface of the sleeve 14. The dividers 29 can be fitted in the openings of the sleeve 14. The dividers 29 are made of metal and have a rectangular outer shape to match that of the inner surface of the conduit 14. Walls 30 divide the inside of each divider 29 into a plurality of spaces. By inserting the dividers 29 in the sleeve 14, the cells, or spaces, of the two dividers 29 are connected, thus forming passages 17. The spare passages 17 are closed by plugs as in the first embodiment.

In the second embodiment, the dividers 29 form the passages 17 in the conduit device 13. Therefore, the number of the passages 17 in the conduit device 13 is changed by changing the number of the walls 30 in the dividers 29.

Third Embodiment

Figure 8A:
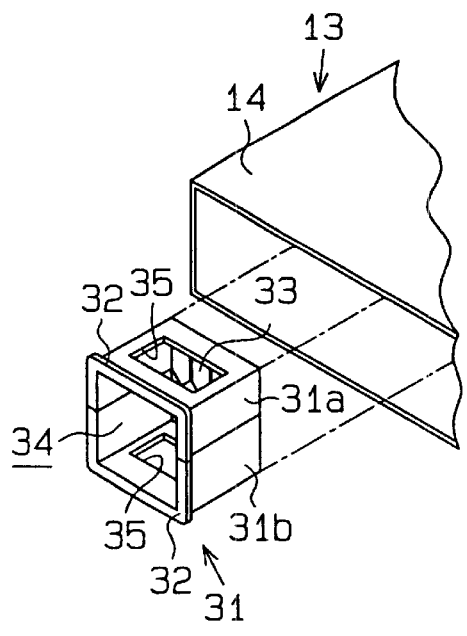
FIG. 8a is an enlarged exploded view showing an end portion of a conduit device according to a third embodiment.
Figure 8B:
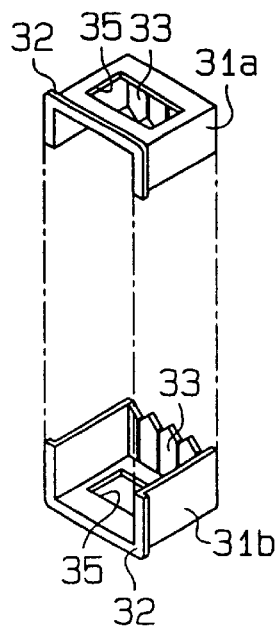
FIG. 8b is an exploded perspective view showing a divider insert of the conduit device of FIG. 8.

In a third embodiment shown in FIGS. 8a and 8b, divider inserts 31 are used in place of the dividers 29. Each divider insert, which is made of synthetic resin, is formed by combining a pair of parts 31a, 31b (see FIG. 8b). Each divider insert 31 includes a pair of rectangular openings 35, a flange 32, and serrated shutters 33. The rectangular openings are formed on the walls of each divider insert 31 to face one another. The flange 32 is formed around the opening of each divider insert 31. The shutters 33 are formed at the bottom of each divider insert 31 to face the flange 32. Each shutter 33 is elastically deformed. When the parts 31a, 31b are combined, the facing shutters contact one another, and this closes the bottom of each divider insert 31. As shown in FIG. 8a, the passages 17 are formed by fitting the divider inserts 31 in the sleeve 14.

Figure 9:
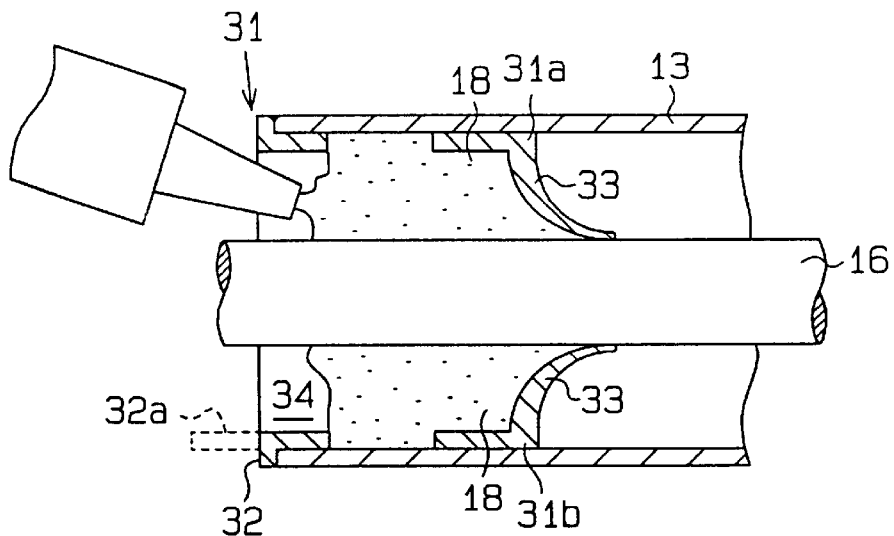
FIG. 9 is a cross sectional view of the conduit device of FIG. 8 with a cable inserted while fireproof sealant is being applied.

Use of the conduit device 13 of the third embodiment will now be described. First, the sleeve 14 is fixed to the partition 11. Then, as shown in FIG. 8b, the parts 31a, 31b are combined. Further, as shown in FIG. 8a, the divider inserts 31 are inserted in the opening of the sleeve 14 until the flange 32 contacts the opening end of the sleeve 14. Then, the elongated object 16 is inserted in each divider insert 31. As shown in FIG. 9, the shutters 33 are elastically bent by the elongated object 16. The elongated object 16 is retained substantially in the center of the divider insert 31 by the shutters 33. Subsequently, the fireproof sealant 18 is filled in a space 34, thus sealing the opening of the conduit device 13. In this state, the fireproof sealant 18 is applied to the inner surface of the conduit device 13 through the openings 35. The fireproof sealant 18 hardens, and this prevents the divider inserts 31 from coming off the sleeve 14.

Furthermore, the fireproof sealant 18 fills the unoccupied space of the spare passages 17. When increasing the number of the elongated objects 16 later, the divider inserts 31 attached to the spare passages 17 are detached from the conduit device 13. Then, new passages 17 are formed following the above procedures. In this detaching work, if a handle 32a is formed on the flange 32 in advance, this will facilitate detaching the divider inserts 31 from the conduit device 13.

The third embodiment has the following advantages. Since the divider inserts 31 form the passages 17 in the conduit device 13, the amount of the fireproof sealant 18 used to seal each passage 17 is reduced. Therefore, the fireproof sealant 18 is efficiently charged, and the installation of the conduit device is easily and quickly performed.

Fourth Embodiment

Figure 10A:
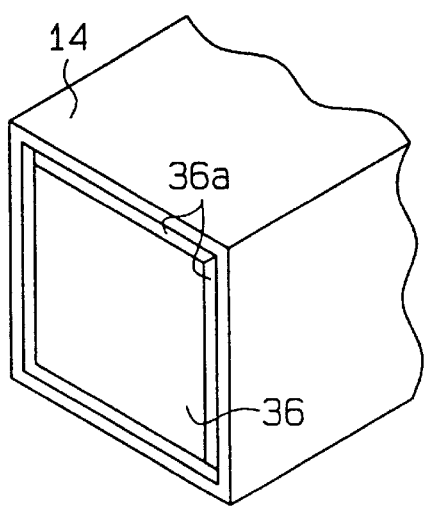
FIG. 10a is a perspective view showing an end of a conduit device according to a fourth embodiment.
Figure 10B:
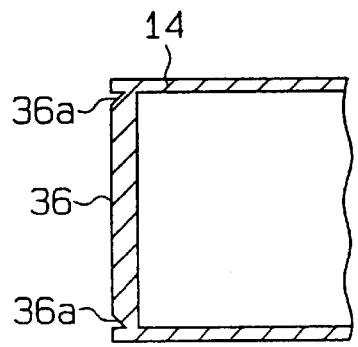

In a fourth embodiment as shown in FIGS. 10a and 10b, a lid 36 is integrally formed on both openings of the sleeve 14 (only one shown). A groove 36a, or line of weakness, is formed on the lid 36. The groove 36a permits the lid to be broken away from the sleeve 14 when inserting the cable in the corresponding passage 17. On the other hand, the lid 36 corresponding to the spare passage 17 is left in place to keep the spare passage 17 closed. When increasing the number of the cables later, the lid 36 is broken along the groove 36a, thus opening the passage 17.

Fifth Embodiment

Figure 11:
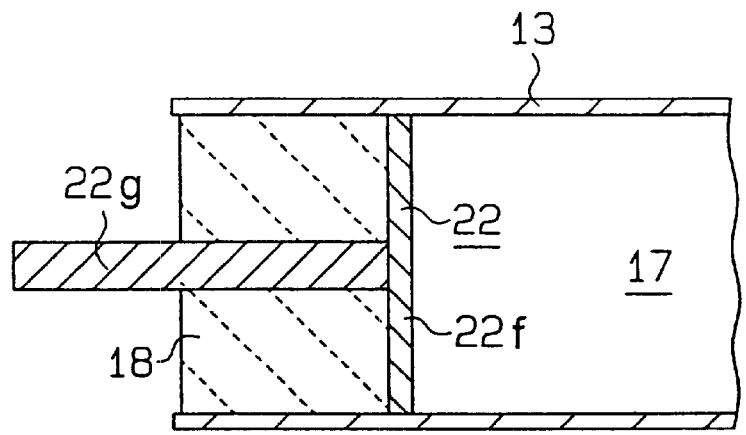
FIG. 11 is a cross sectional view showing an end portion of a conduit device according to a fifth embodiment.

FIG. 11 shows a conduit device 13 according to a fifth embodiment. The conduit 13 includes a plug 22 for closing the spare passages 17. The plug 22 includes a plate 22f and a handle 22g, which projects from the plate 22f. When using the plug 22, the plate 22a is fitted in the spare passage 17. This closes the passage 17. Then, the fireproof sealant 18 fills a space defined by the plate 22f and the inner surface of the passage 17.

When increasing the number of the cables later, the plug 22 is removed by pulling the handle 22g, thus opening the spare passage 17.

Sixth Embodiment

Figure 12:
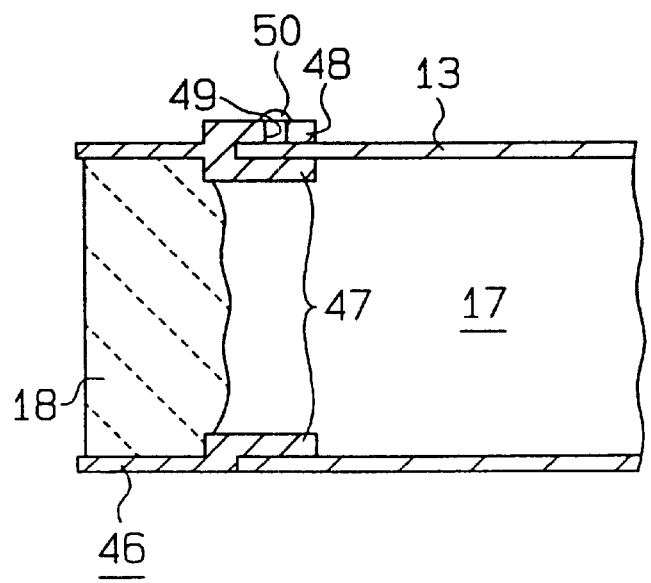
FIG. 12 is a cross sectional view showing a conduit device of a sixth embodiment.
Figure 13:
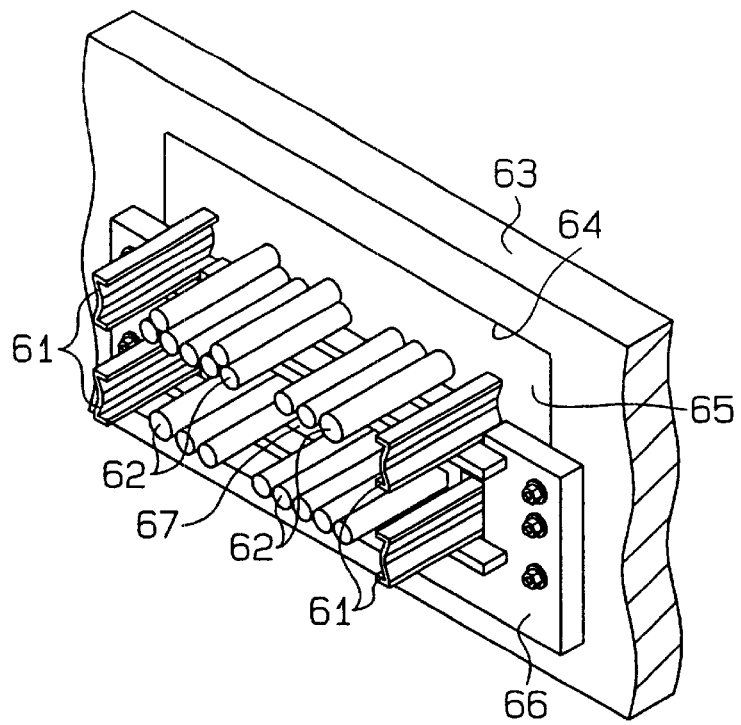
FIG. 13 is a perspective view of a prior art passage structure during installation to a partition.
Figure 14:
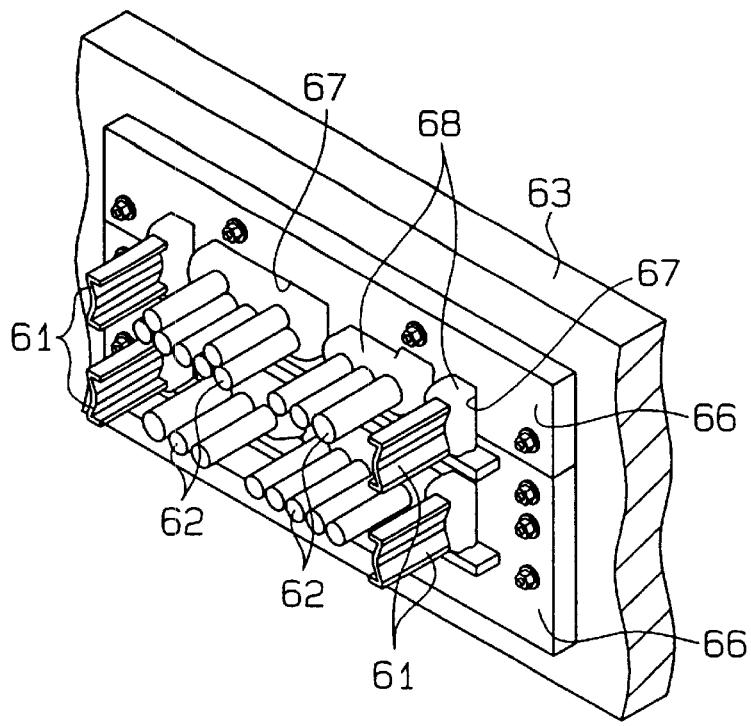
FIG. 14 is a perspective view of a prior art passage structure after installation.

FIG. 12 shows a conduit device 13 according to a sixth embodiment. The conduit device 13 includes a support 46. The support 46 includes a clip 48. An engagement hole 49 is formed in the clip 49. The clip 48 engages the opening end of the spare passage 17. In this state, a pin 50 is screwed in the engagement hole 49. This secures the support 46 to the conduit device 13. Then, the fireproof sealant 18 is filled inside the support 46 to seal the passage 17.

The spare passage 17 is opened again by unscrewing the pin 50 and by detaching the support 46 from the conduit device 13. If a handle is formed on the support 46, the support 46 can be detached more easily.

The above embodiments will be varied as follows.

In the first embodiment shown in FIGS. 1–6, the sleeves 14 may be welded together in advance to form the conduit device 13.

In the second embodiment shown in FIG. 7, the divider 29 may be formed in shape of a ladder using iron wires.

The divider insert 31 of the third embodiment shown in FIG. 8 may be used to close the spare passages 17 of the first and second embodiments.

Partition plates may be used to form passage 17 in the sleeve 14 that has a wide rectangular cross-sectional area.

The rack 23 may be optionally used with any of the above embodiments.

In any of the above embodiments, as shown by the broken line in FIG. 1, a fireproof board 45, which includes a through hole 45a, may be used. In this case, the conduit device 13 is inserted in the through hole 45a and the fireproof board 45 is fixed to the partition 11 with the bolts 45b. This prevents leakage of filler 19 from the through hole 12.

In any of the above embodiments, liquid or gelled foaming material 20 may be applied to the outer surface of the conduit device 13 or the sleeve 14 immediately before installation.

In any of the above embodiments, foam concrete, which expands and hardens by chemical reaction, may be used as the foaming material 20.

The process of manufacturing foam concrete will now be described. For example, portland cement, quick lime (calcium oxide CaO), silica rock, water, aluminum, foam stabilizer, and iron cuttings are mixed. The resulting slurry is delivered between the outer surface of the conduit device 13 and the through hole 12. In the slurry, slaked lime, or calcium hydroxide ($Ca(OH)_2$), is generated by the hydration of CaO and by the hydration of $3CaO.SiO_2$, $2CaO.SiO_2$ in the portland cement. Further, hydrogen gas ($H_2$) is generated by the reaction of quick lime, aluminum and water, or by the reaction of aluminum and water. This forms foam in the slurry. Accordingly, the slurry expands to a predetermined volume. Colloidal glue ($3CaO.2SiO_2.3H_2O$), which is generated by the hydration of $3CaO.SiO_2$, $2CaO.SiO_2$ in the portland cement at the same time with the foaming, hardens the slurry. In this way, cellular concrete is formed, which seals the space between the outer surface of the conduit device 13 and the through hole 12. As a result, the conduit device 13 is firmly supported in the partition 11.

In any of the above embodiments, the foaming material 20 may be applied to the inner surface of the through hole 12. In this case, the foaming material 20 is directly heated and expanded.

In any of the above embodiments, the gelled or liquid foaming material 20 may be dried and hardened to form a sheet. The sheet-shaped foaming material 20 is attached to the outer surface of the conduit device 13 at installation. The sheet-shaped foaming material 20 may be formed to be annular. The annular foaming material 20 may be fitted around the outer surface of the conduit device 13 prior to installation.

Thermal expanding material including soft material such as rubber may be used as the foaming material 20.

In the first embodiment, a handle may be formed on the plug 22. This facilitates detaching the plug 22.

In any of the above embodiments, the cross-sectional shape of the sleeve 14 may be generally circular, part of which is formed to be flat. In this case, the plug is formed to correspond to the internal shape of the sleeve 14.

In any of the above embodiments, a rough surface may be formed on the outer surface of the conduit device 13 to correspond to the position on which the foaming material 20 is attached. In this case, the foaming material 20 is firmly attached to the conduit device 13, thus securing the conduit device 13 to the partition 11.

In any of the above embodiments, even when there is no need to insert any elongated object at the moment, the conduit device 13 having all the passages 17 closed may be installed in the partition 11 for the prospective use.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A conduit assembly for permitting an elongated object to pass through a through hole formed in a partition, wherein the through hole has a first opening and a second opening opposite to the first opening, the conduit assembly comprising:
   a conduit located within the through hole, wherein the conduit has a first end distanced from the first opening, a second end distanced from the second opening and a plurality of ports located at one of the first and the second ends, wherein the elongated object is inserted into at least one of the ports; and
   a removable plug for covering a first one of the ports and having a shutter fitted in the first one of the ports, wherein the removable plug receives a fire-resistant seal material that is applied to the plug to fill a space defined by the shutter and the first one of the ports, and wherein the shutter prevents an inward flow of the sealing material along the port and the plug and the seal material are removed from the first port by removing the plug to open the first port for receiving an elongated object.

2. The conduit assembly according to claim 1, wherein the conduit is subdivided into a plurality of parallel passages.

3. The conduit assembly according to claim 2, wherein the conduit is formed by a plurality of sleeves fastened together.

4. The conduit assembly according to claim 2, wherein a divider is located inside the conduit, wherein the divider separated parallel passages from one another.

5. The conduit assembly according to claim 1, wherein the plug is formed by two plug structures connected endwise to one another.

6. The conduit assembly according to claim 5, the plug structures including a flexible shutter piece for shutting one of the ports at a predetermined distance from the associated end, wherein the shutter piece prevents an inward flow of the sealing material along the port.

7. The conduit assembly according to claim 1, wherein the conduit is made of metal.

8. The conduit assembly according to claim 1, wherein the plug includes a shutter plate fitted in the spare port and a handling rod extending perpendicularly from the shutter plate, wherein the distal end of the handling rod projects from the associate end, and the seal material fills a space defined by the shutter plate and the spare port.

9. The conduit assembly according to claim 1, wherein the plug includes a tubular support filled with a fire-resistant filler, wherein the support has an engaging clip that engages with an edge of the spare port.

10. The conduit assembly according to claim 1, further including a heat-resistant material second seal for sealing between the outer surface of the elongated object and the inner surface of the conduit, wherein the heat-resistant second seal material is located adjacent to at least one end of the conduit.

11. The conduit assembly according to claim 1 further including a fitting attached to the conduit assembly for fixing the conduit assembly to the partition.

12. The conduit assembly according to claim 1 further comprising a rack for supporting the elongated object when the elongated object is being inserted into the conduit and an adaptor for connecting the rack to the conduit assembly.

13. The conduit assembly according to claim 1, wherein the plug includes a cover for closing at least one of the ports, wherein the cover is formed integrally with the conduit, and wherein the cover is separated from the conduit to open an associated one of the ports.

14. The conduit assembly according to claim 13, wherein the cover has a line of weakness along which the cover may be broken to open the associated ports.

15. The conduit assembly according to claim 1, further comprising a fixing material located on an outer wall of the conduit for fixing the conduit to the through hole.

16. The conduit assembly according to claim 15, wherein the fixing material is fire-resistant.

17. The conduit assembly according to claim 15, wherein the conduit has a rough outer surface where the fixing material contacts the conduit.

18. The conduit assembly according to claim 15, wherein the fixing material is a coating that is applied to the conduit prior to installation of the conduit assembly.

19. The conduit assembly according to claim 15, wherein the fixing material expands in accordance with a predetermined process.

20. The conduit assembly according to claim 19, wherein the fixing material expands when heated.

21. The conduit assembly according to claim 19, wherein the fixing material expands as a result of a chemical reaction.

22. The conduit assembly according to claim 19, wherein the fixing material hardens after expanding.

23. A method for installing a conduit assembly to a partition, wherein the conduit assembly permits an elongated object to pass through a through hole formed in the partition, wherein the conduit assembly has a first end, a second end opposite to the first end, and a plurality of ports located at one of the ends, the method including:
   locating an expandable fixing material on the outer surface of the conduit assembly;
   inserting the conduit assembly into the through hole so that the first and the second ends of the conduit are projected from the partition;
   drying the fixing material, wherein the fixing material expands and seals between the outer surface of the conduit assembly and a surface defining the through hole when drying;
   inserting the elongated object into a first one of the ports; and
   sealing a space between the outer surface of the elongated object and the inner surface of the conduit assembly near the first port.

24. The method according to claims 23 further including hardening the fixing material after the expanding step.

25. The method according to claim 23, wherein the locating step includes applying the fixing material on the outer surface of the conduit assembly and drying only a surface of the fixing material.

26. The method according to claim 23, including installing a plug in a second one of the ports.

27. The method according to claim 26, further including removing the plug from the second port and installing an additional elongated object into the second port.

28. A method for using a conduit assembly that permits an elongated object to pass through a through hole formed in a partition, wherein the conduit assembly has a plurality of passages, the method including:
   locating an expandable fixing material on the outer surface of the conduit assembly;
   inserting the conduit assembly into the through hole so that the end of the conduit is projected from the partition;
   drying the fixing material, wherein the fixing material expands and seals between the outer surface of the conduit assembly and an inner surface defining the through hole while drying;

inserting the elongated object into a first one of the passages;

sealing a space between the outer surface of the elongated object and the inner surface of the first passage near a first end of the first passage;

closing a second one of the passages using a removable plug having a shutter fitted in the second one of the passages;

filling a space defined by the shutter and the second one of the passages by applying a fire-resistant seal material to the plug;

opening the second passage by removing the plug when an additional elongated object is required, wherein the seal material is removed by removing the plug;

inserting the additional elongated object into the second passage; and sealing a space between the outer surface of the additional elongated object and an inner surface of the second passage near a first end of the second passage.

* * * * *